(12) United States Patent
Choi et al.

(10) Patent No.: US 9,071,852 B2
(45) Date of Patent: Jun. 30, 2015

(54) METHOD FOR PROVIDING MEDIA-CONTENT RELATED INFORMATION, DEVICE, SERVER, AND COMPUTER-READABLE STORAGE MEDIUM FOR EXECUTING THE METHOD

(75) Inventors: Yoon-hee Choi, Suwon-si (KR); Hee-seon Park, Seoul (KR); Il-hwan Choi, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 13/236,213

(22) Filed: Sep. 19, 2011

(65) Prior Publication Data

US 2012/0072947 A1    Mar. 22, 2012

(30) Foreign Application Priority Data

Sep. 17, 2010    (KR) .................. 10-2010-0091960

(51) Int. Cl.

| | |
|---|---|
| H04H 60/33 | (2008.01) |
| H04H 60/32 | (2008.01) |
| H04N 7/10 | (2006.01) |
| H04N 7/025 | (2006.01) |
| H04N 21/234 | (2011.01) |
| H04N 21/44 | (2011.01) |
| H04N 21/8405 | (2011.01) |
| H04N 21/237 | (2011.01) |
| H04N 21/482 | (2011.01) |

(Continued)

(52) U.S. Cl.
CPC ... *H04N 21/23418* (2013.01); *H04N 21/44008* (2013.01); *H04N 21/8405* (2013.01); *H04N 21/237* (2013.01); *H04N 21/4828* (2013.01); *H04N 21/6581* (2013.01); *H04N 21/8133* (2013.01)

(58) Field of Classification Search
USPC .......................................... 725/34
See application file for complete search history.

(56) References Cited

U.S. PATENT DOCUMENTS 7,400,364 B2 *  7/2008  Chen et al. .................. 348/731
7,657,918 B2    2/2010  Gordon et al.

(Continued)

FOREIGN PATENT DOCUMENTS

| DE | 102007030131 | 10/2008 |
|---|---|---|
| JP | 2009-010797 | 1/2009 |

(Continued)

OTHER PUBLICATIONS

European Search Report dated Nov. 21, 2013 issued in a counterpart application No. 11180045.4-1908.

(Continued)

*Primary Examiner* — Justin Shepard
(74) *Attorney, Agent, or Firm* — The Farrell Law Firm, P.C.

(57) ABSTRACT

A method for providing media content-related information by using a device capable of accessing a server via a network is provided, the method comprising: generating identification information of media content being reproduced by the device; transmitting the identification information from the device to the server; receiving at least one of key information and media content-related information, from the server, in response to the identification information; and providing a user of the device with the media content-related information about the media content based on the at least one of the key information and the media content-related information received from the server.

13 Claims, 8 Drawing Sheets

(51) Int. Cl.
*H04N 21/658* (2011.01)
*H04N 21/81* (2011.01)

(56) References Cited

U.S. PATENT DOCUMENTS

| | | | |
|---|---|---|---|
| 8,103,050 B2* | 1/2012 | Lefebvre et al. | 382/100 |
| 2004/0040042 A1* | 2/2004 | Feinleib | 725/112 |
| 2005/0044189 A1 | 2/2005 | Ikezoye et al. | |
| 2005/0097329 A1 | 5/2005 | Morimoto et al. | |
| 2007/0124796 A1 | 5/2007 | Wittkotter | |
| 2008/0066098 A1* | 3/2008 | Witteman et al. | 725/34 |
| 2008/0170622 A1 | 7/2008 | Gordon et al. | |
| 2008/0201736 A1 | 8/2008 | Gordon et al. | |
| 2008/0266449 A1 | 10/2008 | Rathod et al. | |
| 2009/0012939 A1 | 1/2009 | Kato et al. | |
| 2009/0077049 A1 | 3/2009 | Seet et al. | |
| 2009/0164460 A1 | 6/2009 | Jung et al. | |
| 2009/0320061 A1 | 12/2009 | Pettit et al. | |
| 2010/0083314 A1 | 4/2010 | Takahashi | |
| 2010/0131997 A1* | 5/2010 | Locker et al. | 725/109 |
| 2010/0169930 A1 | 7/2010 | Ito et al. | |
| 2010/0179972 A1 | 7/2010 | Asano et al. | |

FOREIGN PATENT DOCUMENTS

| | | |
|---|---|---|
| JP | 2009-021816 | 1/2009 |
| JP | 2009-212857 | 9/2009 |
| JP | 2010-087976 | 4/2010 |
| JP | 2010-161722 | 7/2010 |
| KR | 1020070065608 | 6/2007 |
| WO | WO 2004/043029 | 5/2004 |
| WO | WO 2010/025418 | 3/2010 |
| WO | WO 2010/044014 | 4/2010 |

OTHER PUBLICATIONS

European Search Report dated Nov. 11, 2014 issued in counterpart application No. 14183697.3-1908.
Japanese Office Action dated Apr. 6, 2015 issued in counterpart application No. 2011-201506.

* cited by examiner

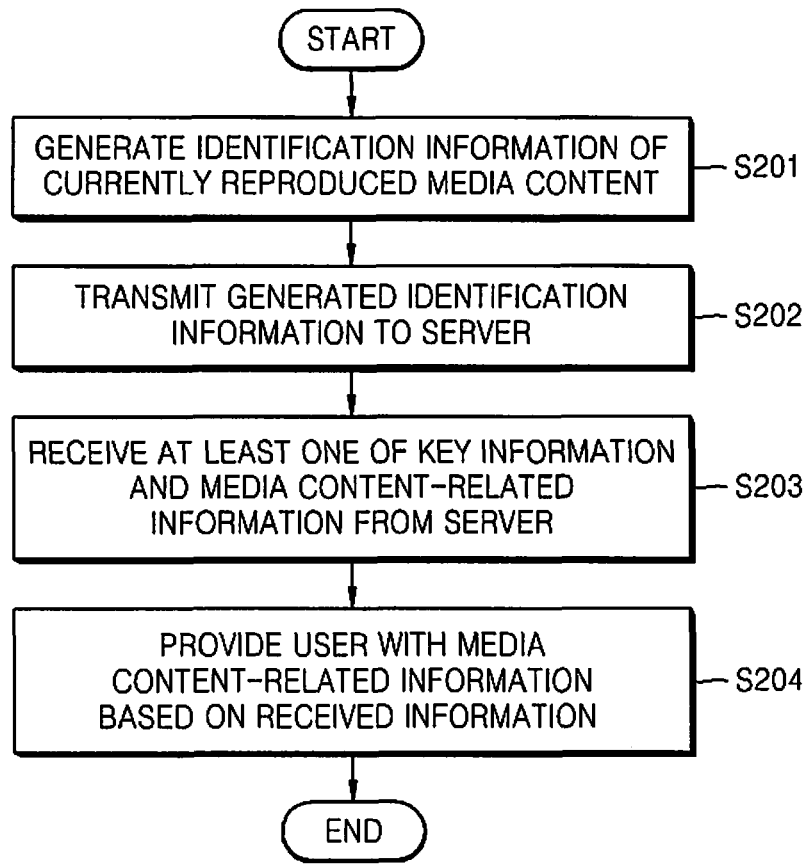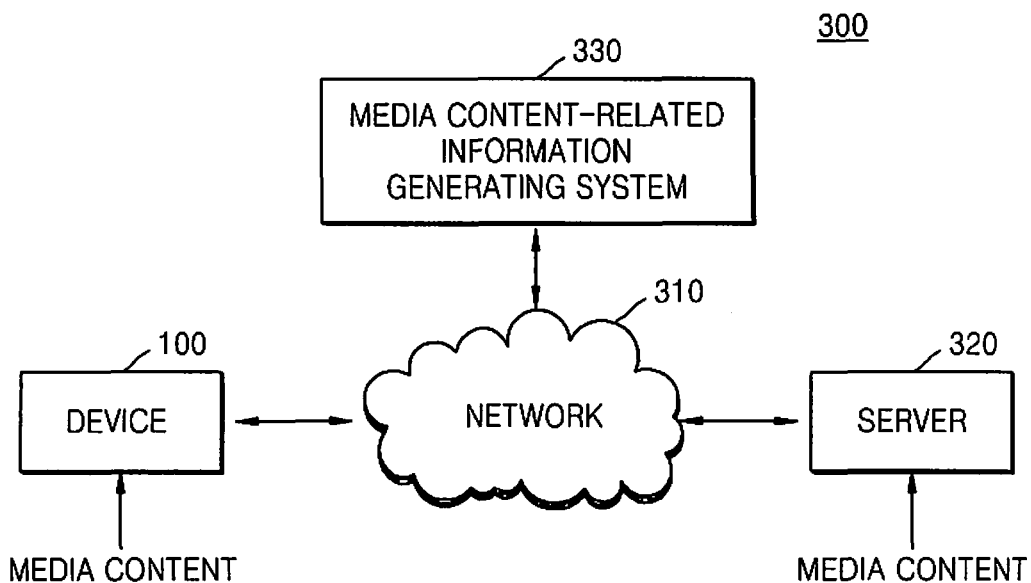

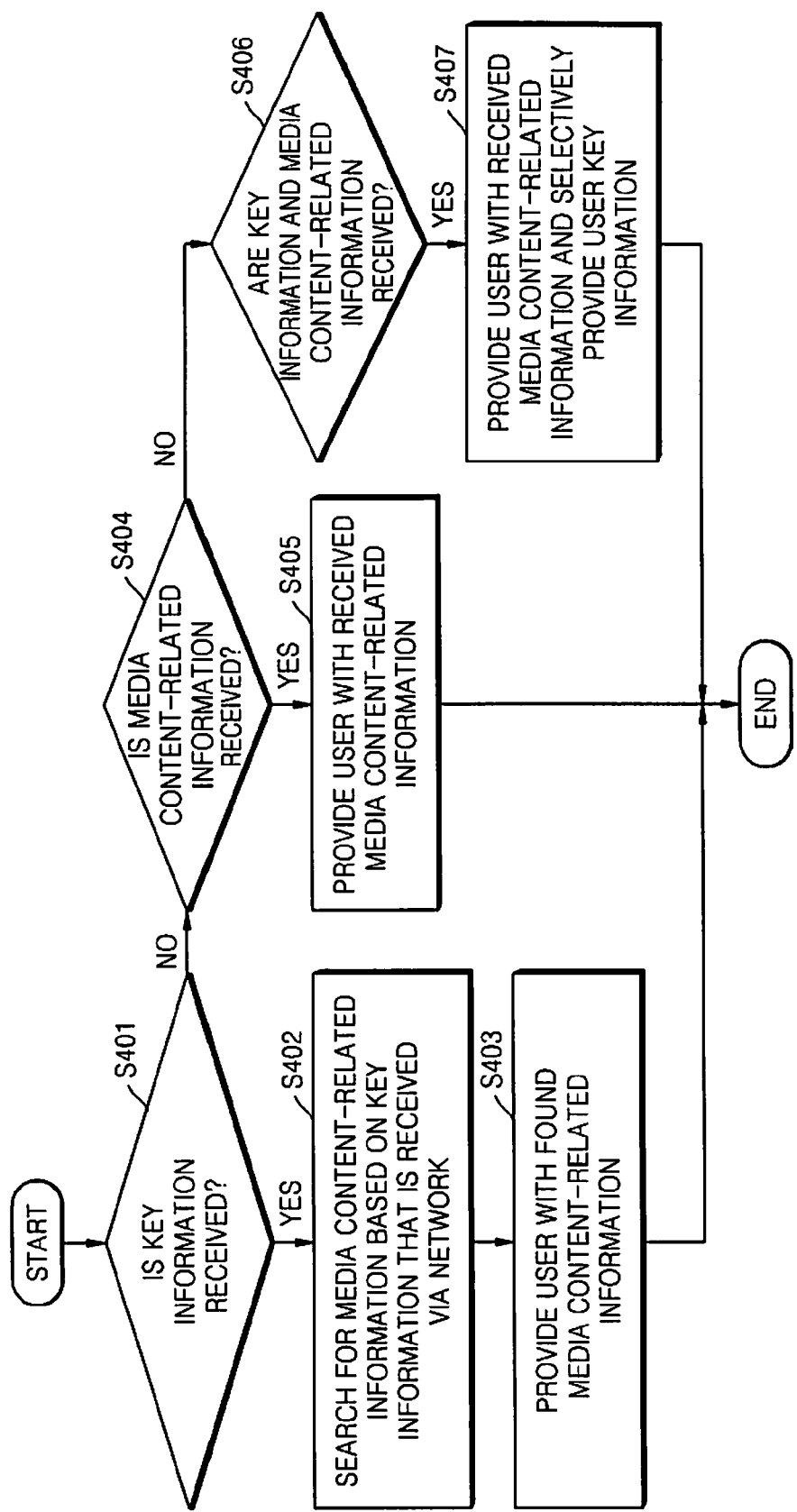

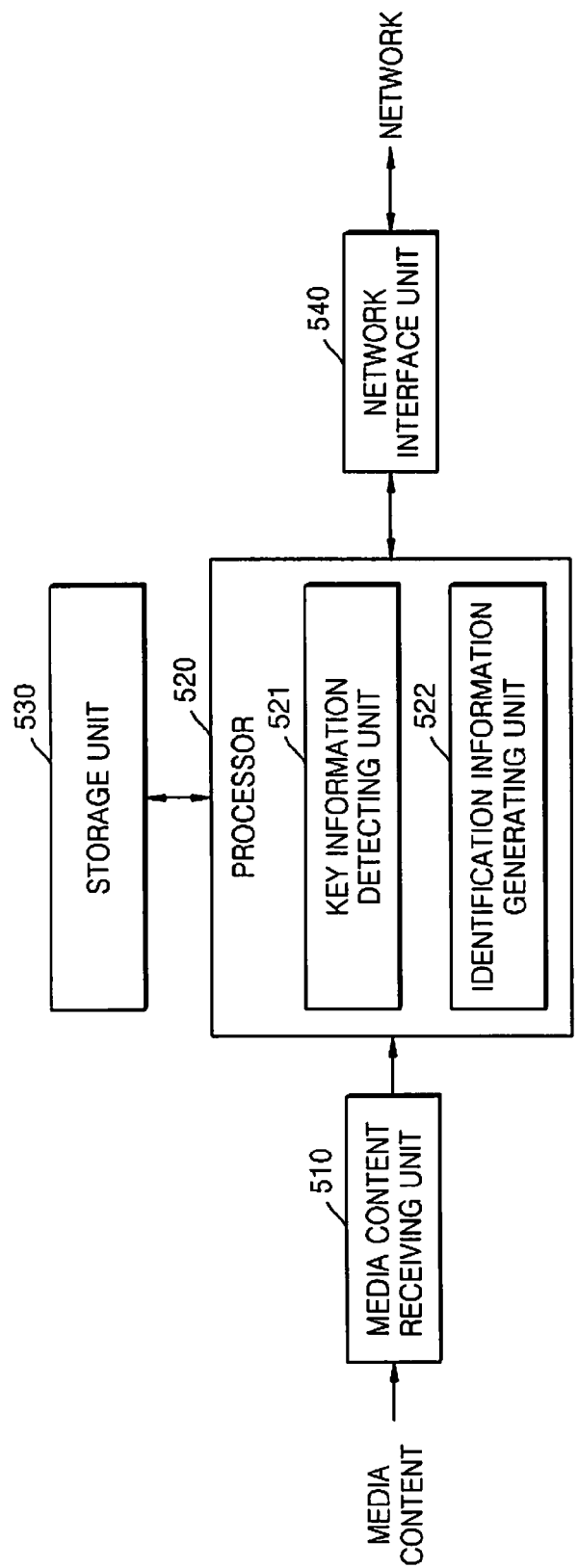

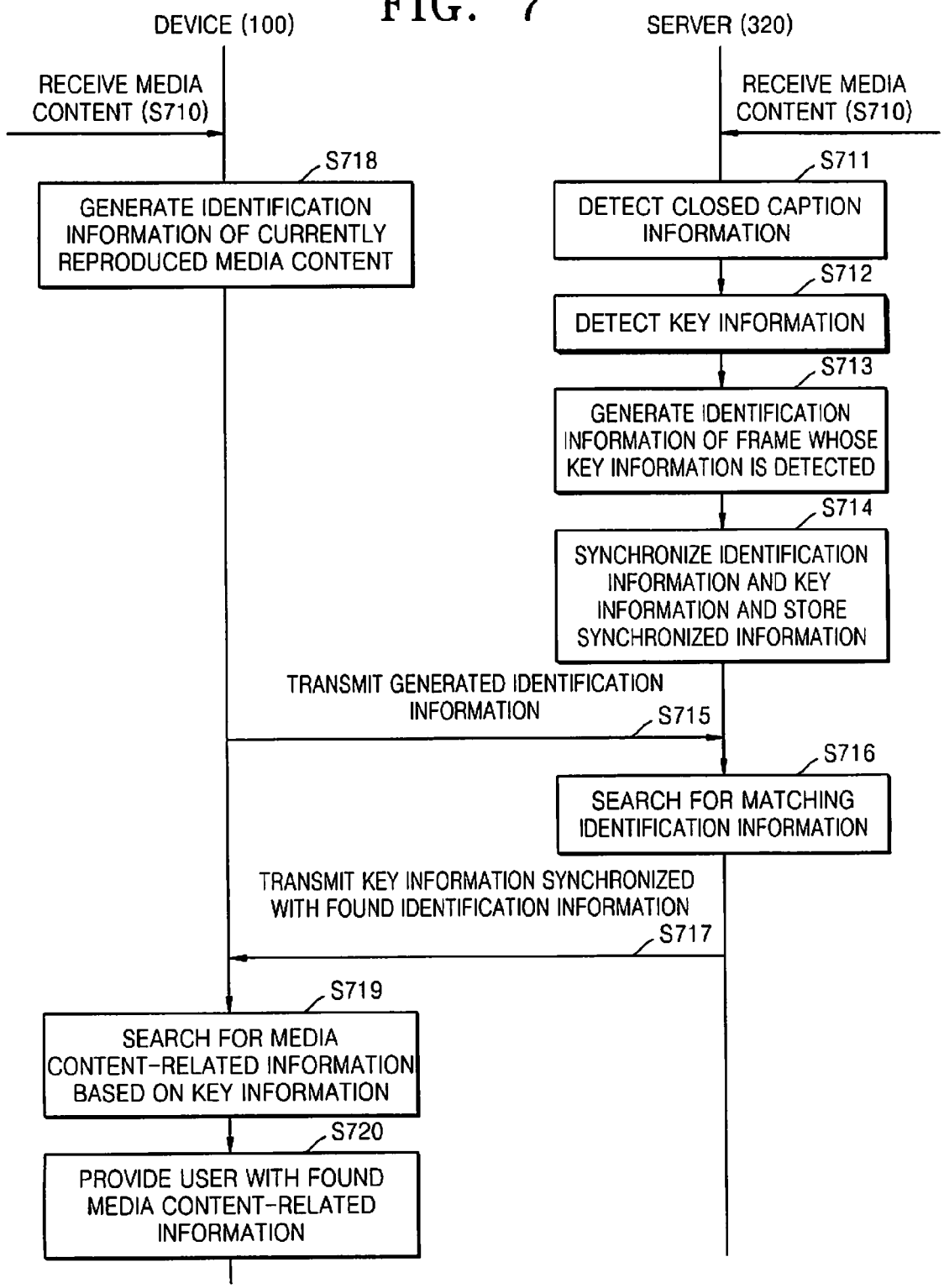

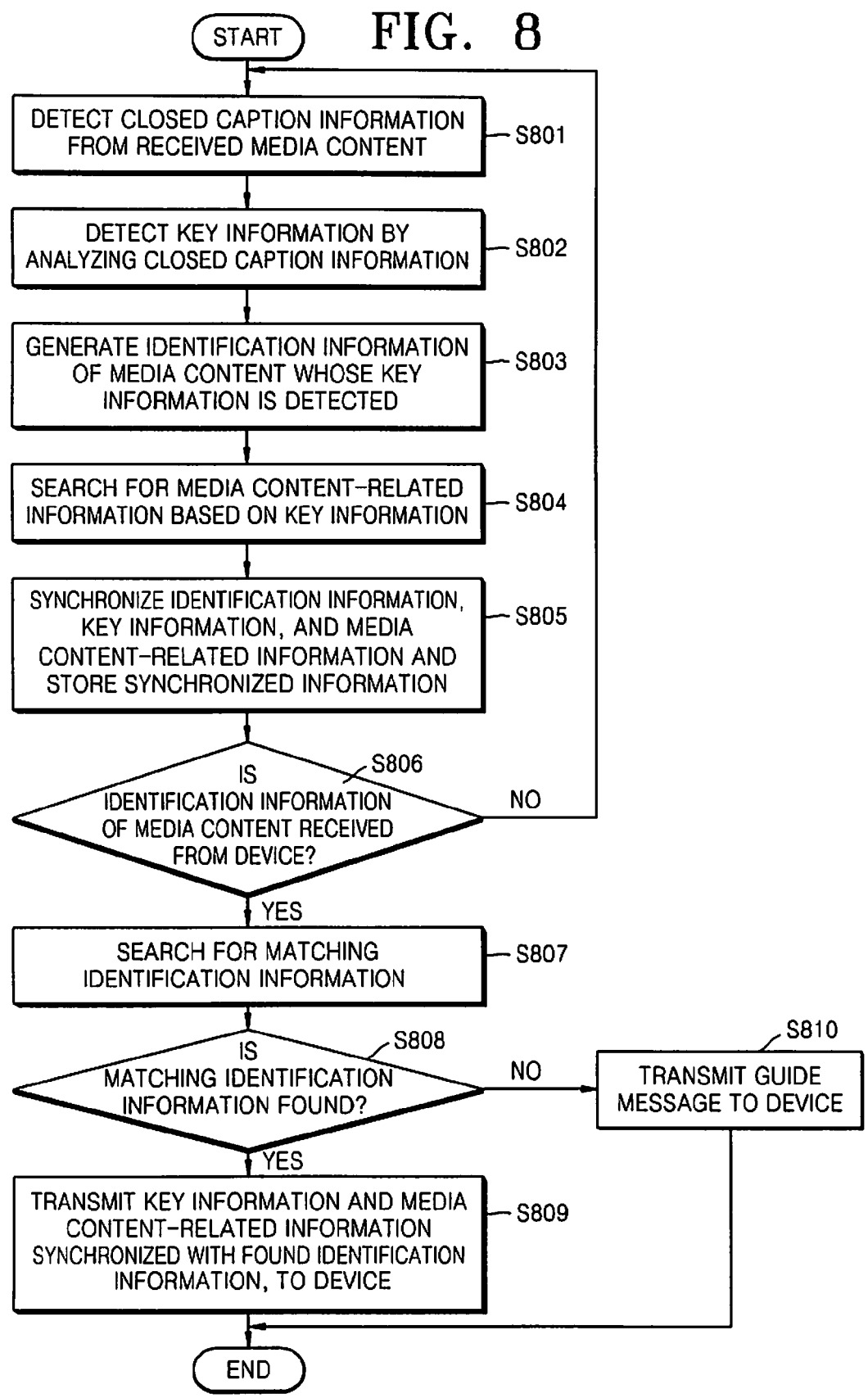

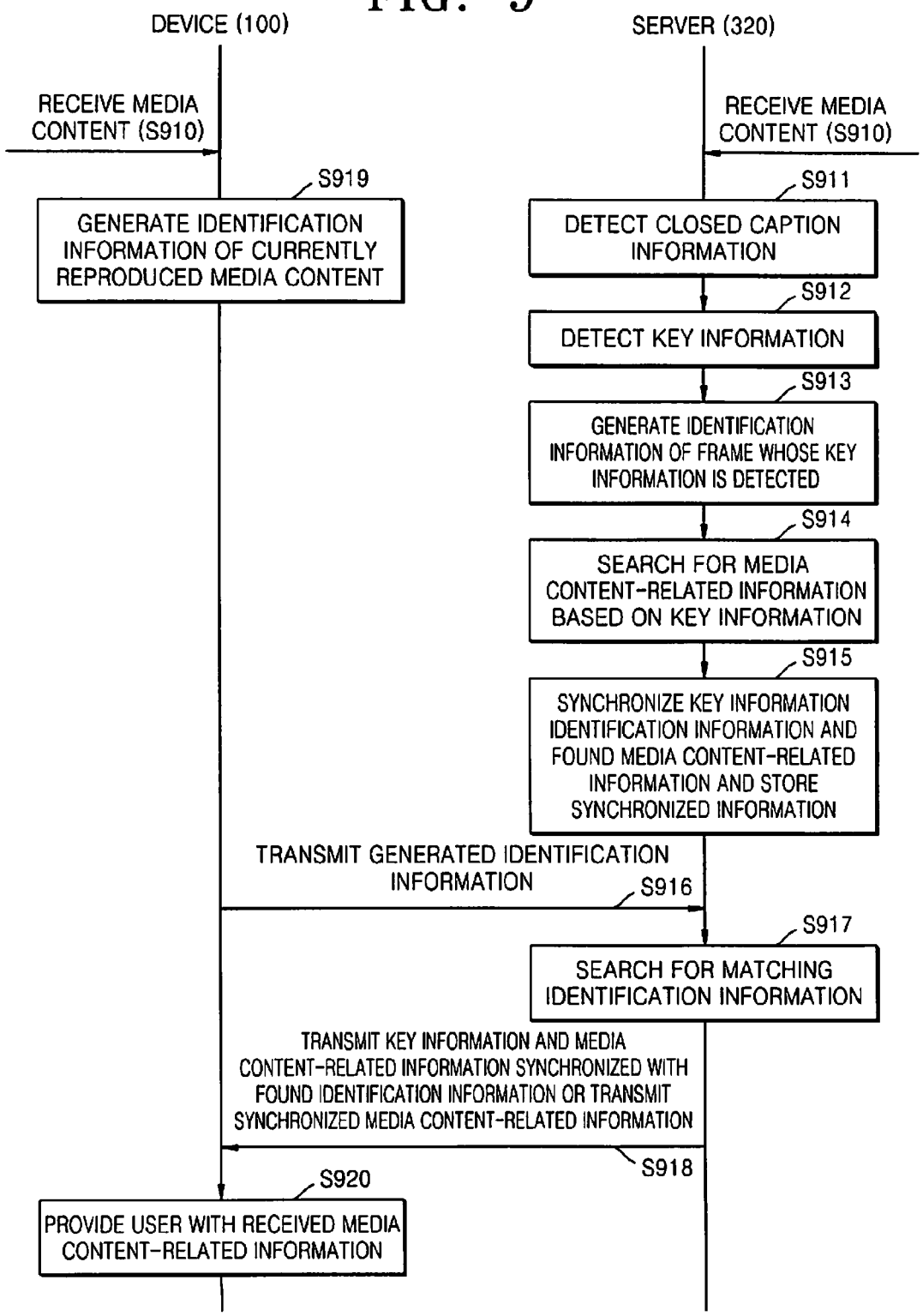

METHOD FOR PROVIDING MEDIA-CONTENT RELATED INFORMATION, DEVICE, SERVER, AND COMPUTER-READABLE STORAGE MEDIUM FOR EXECUTING THE METHOD

PRIORITY

This application claims priority to Korean Patent Application No. 10-2010-0091960, filed on Sep. 17, 2010 in the Korean Intellectual Property Office, the entire disclosure of which is incorporated herein by reference.

BACKGROUND OF THE INVENTION

1. Field of the Invention

The present invention relates to methods of providing media content-related information, a device, a server, and a computer readable storage medium for executing the method.

2. Description of the Related Art

Media content can be provided based on media such as terrestrial broadcasting, satellite broadcasting, cable broadcasting, Internet broadcasting, digital multimedia broadcasting, Bluetooth®, storage media such as Blu-ray and Digital Video Disc (DVD), and so on. Media content may be expressed as audio and/or video (or image) and/or text formats, and may be broadcasting content or multimedia content.

Together with the media content, various relevant information may be provided. For example, media content provider information, media content guide information, place information, product information, actor information, artist information, banner advertisement information, advertiser information, media content purchase information, and event information may be provided as media content-related information.

Examples of devices that can reproduce media content are devices with a media player function and TeleVisions (TVs). Conventional devices that can reproduce media content usually have a media content playing function but do not have a function of providing the above-described media content-related information.

Accordingly, a user obtains the above-described media content-related information by searching the Internet based on media content information that the user already knows by using an Internet access device. For example, the user may use an Internet search engine to search media content-related information based on information the user knows or may access a website that provides media content to search for media content-related information.

Thus, the user may not easily obtain related information that is synchronized with media content, which is currently reproduced, and available media content-related information is limited since the Internet search is conducted based only on information that the user knows. For example, when using the above-described Internet search engine, in order to obtain exact media content-related information, the found information is to be analyzed individually, and when accessing a website providing corresponding media content, the user may obtain media content-related information that is provided only by the website.

SUMMARY OF THE INVENTION

An aspect of the present invention is to provide methods of providing media content-related information, which is synchronized with media content in real-time.

Another aspect of the present invention is to provide a device, a server, and a computer readable storage medium for executing the method.

According to an aspect of the present invention, there is provided a method for providing media content-related information by using a device capable of accessing a server via a network, the method including generating identification information of media content that are currently being reproduced by the device; transmitting the generated identification information from the device to the server; receiving at least one of key information and media content-related information, from the server; and providing the user with the media content-related information about the media content based on the information received from the server. According to another aspect of the present invention, there is provided a method for providing media content-related information using a server that is accessed by at least one device via a server, the method including detecting key information based on closed caption information of received media content in the server; generating identification information of media content based on which the key information is detected among the received media content in the server; synchronizing the identification information and the key information and storing the synchronized information in the server; searching, when identification information of media content is received from the at least one device, for identification information that matches the received identification information from among the stored identification information in the server; and transmitting, when the matched identification information is found, key information synchronized with the found identification information, from the server to the device.

According to another aspect of the present invention, there is provided a device including a media content-receiving unit receiving media content; a reproducing unit reproducing the received media content; a network interface unit interfacing with a network; and a processor generating identification information of media content that are currently being reproduced by using the reproducing unit, and transmitting the generated identification information to a server via the network interface unit, and providing, when at least one of key information and media content-related information is received from the server, the user with the media content-related information about the media content based on the received information, by using the reproducing unit.

According to another aspect of the present invention, there is provided a server including a key information-detecting unit detecting key information based on closed caption information of received media content; an identification information-detecting unit detecting identification information of the media content based on which the key information is detected; a network interface unit interfacing with a network; a processor synchronizing the detected key information and the detected identification information and storing the synchronized information, and searching, when identification information of media content is received from at least one device via the network interface unit, for identification information that matches the received identification information among the stored identification information, and transmitting key information synchronized with the found identification information to the device via the network interface unit; and a storage unit storing the key information and the identification information.

According to another aspect of the present invention, there is provided a non-transitory computer-readable recording medium having embodied thereon a computer program for executing a method for providing media content-related information, wherein the method for providing media content-related information may be performed in the same manner as the above-described method for providing media content-related information.

BRIEF DESCRIPTION OF THE DRAWINGS

The above and other aspects, features and advantages of the present invention will become more apparent by describing in detail illustrative embodiments thereof with reference to the attached drawings in which:

FIG. 2 is a flowchart illustrating a method for providing media content-related information by using a device according to an embodiment of the present invention;

FIG. 3 illustrates a network system to which a device and a server, according to an embodiment of the present invention may be applied;

FIG. 4 is a detailed flowchart illustrating steps of a process of providing media content-related information to a user by using a device, according to an embodiment of the present invention;

FIG. 5 is a functional block diagram illustrating a server according to an embodiment of the present invention;

FIG. 7 is a flowchart illustrating a step between a device and a server, according to an embodiment of the present invention;

FIG. 8 is a flowchart illustrating a method for providing media content-related information via a server, according to an embodiment of the present invention; and FIG. 9 is a flowchart illustrating a step between the device and the server illustrated in FIGS. 2 and 8.

DETAILED DESCRIPTION OF EMBODIMENTS OF THE PRESENT INVENTION

The present invention will now be described more fully with reference to the accompanying drawings, in which illustrative embodiments of the invention are shown.

Figure 1:
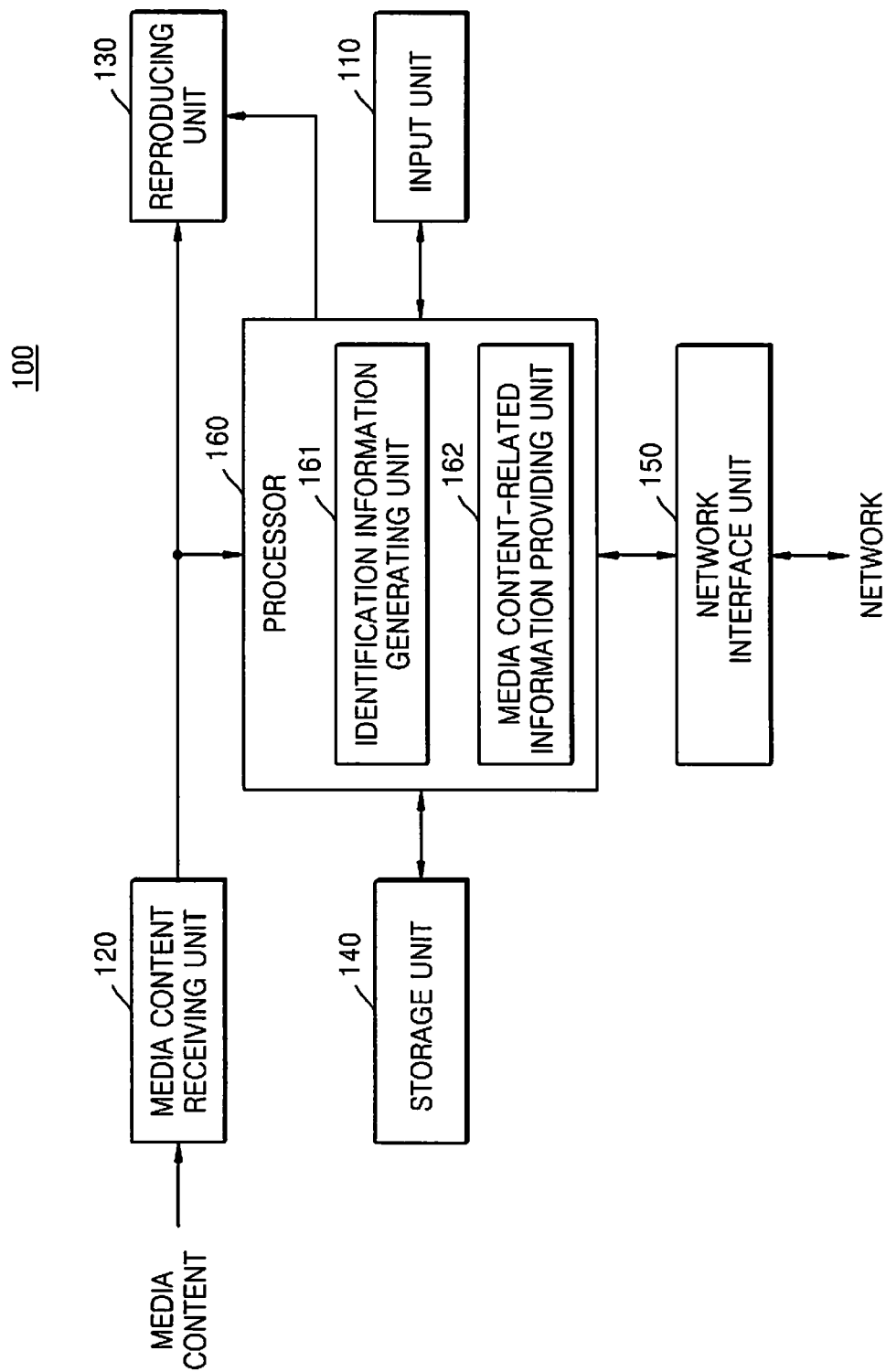
FIG. 1 is a functional block diagram illustrating of a device according to an embodiment of the present invention.

FIG. 1 is a functional block diagram illustrating a device 100 according to an embodiment of the present invention. The device 100 includes a function of connecting to a wired/wireless network and a function of reproducing media content.

The device 100 may be a computer having a multi-player function, a mobile device having a media player function, and a television (TV) that can be connected to a wired/wireless network. Examples of mobile devices are mobile phones, smart phones, Personal Digital Assistants (PDAs), Portable Multi-media Players (PMPs), and navigation devices. The mobile devices may be referred as potable devices. The TV can be included in the mobile devices, and may be a device, such as Internet Protocol TeleVision (IPTV), or a digital multi-media broadcasting device. The device 100 may be a user device. The device 100 may be a TV that does not have a closed caption function.

Referring to FIG. 1, the device 100 includes an input unit 110, a media content-receiving unit 120, a reproducing unit 130, a storage unit 140, a network interface unit 150, and a processor 160. The device 100 may include more or less elements than as illustrated in FIG. 1. For example, the input unit 110 and the reproducing unit 130 may be combined as a user interface unit or a graphic user interface. The reproducing unit 130 may include a reproducing signal processing unit and an output unit. If the reproducing unit 130 is defined as a reproducing signal processing unit and an output unit, the above-described user interface unit or the graphic user interface may include the input unit 110 and the output unit. The output unit may be a display unit. The storage unit 140 or the network interface unit 150 may be included in the processor 160. The processor 160 may be implemented based on the identification information-generating unit 161 and the media content-related information providing unit 162.

The user may input information or commands via the input unit 110. Examples of information or commands, which can be input by the user according to an embodiment of the present invention, can include a selection signal regarding media content to be reproduced. The input unit 110 may be touch-based. That is, the input unit 110 may be implemented based on a touch interface using a touch panel or a touch screen that generates an input signal (or input data) according to a contact position of a finger or a stylus pen.

The media content-receiving unit 120 receives media content. Media content may be received based on media such as terrestrial broadcasting, satellite broadcasting, cable broadcasting, Internet broadcasting, digital multimedia broadcasting, Bluetooth®, storage media such as Blu-ray and Digital Video Disc (DVD), and so on. Examples of media content may include real-time broadcasting content including live broadcasting. The media content-receiving unit 120 may be configured to receive media content according to a set media type.

For example, in a broadcasting reception mode such as terrestrial broadcasting, satellite broadcasting, cable broadcasting, Internet broadcasting, and digital multimedia broadcasting, the media content-receiving unit 120 may receive media content provided by a broadcasting provider. The broadcasting provider may be a broadcasting station, a broadcasting company, a broadcasting operator, or a broadcasting carrier. The received media content may be real-time broadcasting content. In a reception mode based on wireless communication such as Bluetooth®, the media content-receiving unit 120 receives media content provided by an external device based on wireless communication, such as Bluetooth®. In a reception mode based on a storage medium, the media content-receiving unit 120 receives media content from a storage medium connected in a wired or wireless manner.

In order to receive media content based on various media, the media content-receiving unit 120 may be configured to include modules according to media types. In the case of media content received based on a network, media content may be received via the network interface unit 150. For example, media content provided via Internet broadcasting, digital multimedia broadcasting, or by a particular website may be received via the network interface unit 150. The media content-receiving unit 120 may not include a function of detecting closed caption information.

The reproducing unit 130 reproduces media content received from the media content-receiving unit 120. When media content are video content, the reproduction may be performed by displaying. When media content are video and audio content, the reproduction may be display and audio output. When media content are text, the reproduction may be display. The reproducing unit 130 may include reproduction signal processing with respect to the received media content.

When the reproducing unit 130 and the input unit 110 are formed as a user interface unit, the reproducing unit 130 may be an output unit. The reproducing unit 130 may be controlled by the processor 160 and output media content-related information. The media content-related information may be media content relevant information. The reproducing unit 130 may be configured to include a Liquid Crystal Display (LCD), a Thin Film Transistor-Liquid Crystal Display (TFT LCD), an Organic Light-Emitting Diode (OLED), a flexible display, a 3D display, an Active-Matrix Organic Light-Emitting Diode (AM OLED), and so on.

The storage unit 140 may store application programs, data which are used to perform a method for providing media content-related information according to embodiments of the present invention, received media content, media content-related information, and key information.

The network interface unit 150 may be controlled by the processor 160 to access a wired or wireless network and receive a media content from a website or an Internet broadcasting provider. The Internet broadcasting provider may be an Internet broadcasting carrier or an Internet broadcasting station. The network interface unit 150 may access a server and receive at least one among media content-related information and key information or transmit identification information of media content that is generated by the processor 160 to the server. Accordingly, the network interface unit 150 may include communication functions such as a broadcasting reception function, a mobile communication function, a near-distance communication function, and an Internet access function. The network interface unit 150 may be a communication unit. The function of the network interface unit 150 is not limited as described above.

The processor 160 may be operated by loading a program for performing the method for providing media content-related information stored in the storage unit 140. The program may be stored in the storage unit 140 when manufacturing the device 100, but may also be downloaded from a server (not shown) via the network interface unit 150 and be stored in the storage unit 140. The server (not shown) may be an App Store server (not shown), but is not limited thereto. Also, the method for providing media content-related information may be a method of generating media content-related information.

The processor 160 controls all functions of the device 100, and may be a controller or a microprocessor, but is not limited thereto. The processor 160 may include an identification information-generating unit 161 and a media content-related information providing unit 162 as hardware. Programs loaded in the processor 160 may perform functions corresponding to those of the identification information-generating unit 161 and the media content-related information providing unit 162.

The identification information-generating unit 161 may generate identification information of media content that are currently being reproduced by the reproducing unit 130. When the currently reproduced media content are video content, the currently reproduced media content may be a video frame being currently displayed. Identification information may be a digital fingerprint of the video frame that is currently being displayed. A digital fingerprint of a video frame may be generated by digital signal processing. For example, interest point extraction algorithms such as Scale Invariant Feature Transform (SIFT), Speeded Up Robust Feature (SURF), and Maximally Stable Extremal Regions (MSER) may be used to generate a digital fingerprint of a video frame.

When generating identification information, the identification information-generating unit 161 may generate identification information by considering a change of a shot. A shot refers to frames depicting the same scene or frames that are divided by a single camera operation. Accordingly, the identification information-generating unit 161 may detect a shot change by measuring a difference between video frames that are reproduced by the reproducing unit 130 or by using a wavelet conversion technique, and a digital fingerprint of a video frame at a point at which a shot change is detected may be generated as identification information. The shot change may be shot detection, and a video frame of the point at which the shot change is detected may be a first frame or a representative frame of a shot.

If a shot does not change during a predetermined period of time, the identification information-generating unit 161 may generate identification information of media content (video frame) being currently reproduced on the reproducing unit 130 after a predetermined period of time has elapsed. The time period may be set as, for example, 10 seconds, but is not limited thereto.

The media content-related information providing unit 162 may output media content-related information found via the network interface unit 150 or media content-related information received via the network interface unit 150 based on key information received via the network interface unit 150 to the reproducing unit 130 to provide the user with the information.

The processor 160 may operate as illustrated in FIG. 2. FIG. 2 is a flowchart illustrating a method for providing media content-related information by using the device 100, according to an embodiment of the present invention. As illustrated in FIG. 3, the device 100 may access a server 320 via a network 310 and provide the user with media content-related information. FIG. 3 illustrates the network system 310 to which the device 100 and the server 320 may be applied, according to an embodiment of the present invention. The network 310 is a wired/wireless network. The server 320 provides media content-related information or key information to the device 100 according to an embodiment of the present invention. A media content-related information generating system 330 transmits media content-related information generated by accessing the device 100 or the server 320, to the device 100 or the server 320.

Referring to FIG. 2, in step S201, the processor 160 generates identification information of media content that is currently being reproduced by using the reproducing unit 130, as described in the above-described identification information-generating unit 161 of FIG. 1. Accordingly, the identification information may be a digital fingerprint of a video frame that is reproduced on the reproducing unit 130 at a point at which a shot change as described in regard to the above-described identification information-generating unit 161 is detected.

In step S202, the processor 160 transmits the generated identification information to the server 320 via the network interface unit 150. Accordingly, when at least one of key information and media content-related information is received from the server 320, the processor 160 provides media content-related information to the user based on the received information in steps S203 and S204. Key information is based on a result of analyzing closed caption information synchronized with media content (or a video frame) for which identification information is generated in step S201. The key information may include keywords or key phrases that may be used when searching for data using available Internet search engines.

Step S204 of FIG. 2 may be implemented as illustrated in FIG. 4. FIG. 4 is a flowchart illustrating a process of providing media content-related information to a user by using the device 100, according to an embodiment of the present invention.

When only key information is received from the server 320 via the network interface unit 150, the processor 160 searches for media content-related information based on the received key information from a network connected via the network interface unit 150 in steps S401 and S402. Media content-related information may be provided from the media content-related information generating system 330 illustrated in FIG. 3. The media content-related information generating system 330 is configured as a database server and may generate, store, and manage media content-related information based on information input by a media content provider or an information provider, but is not limited thereto. The processor 160 may provide the found or searched media content-related information to the user via the reproducing unit 130 in step S403.

When only media content-related information is received from the server 320 via the network interface unit 150, the processor 160 provides the user with the received media content-related information via the reproducing unit 130 in steps S404 and S405.

When both key information and media content-related information are received from the server 320 via the network interface unit 150, the processor 160 may provide the user with media content-related information via the reproducing unit 130, and may selectively provide the user with key information via the reproducing unit 130 in steps S406 and S407. Key information may be selectively provided to the user according to a request by the user input via the input unit 110. For example, a query about whether the received key information is to be output (or provided) together with the received media content-related information is output via the reproducing unit 130, and if an output of the received key information is also requested via the input unit 110, key information and media content-related information may be output together via the reproducing unit 130.

FIG. 5 is a functional block diagram illustrating the server 320 according to an embodiment of the present invention. Referring to FIG. 5, the server 320 may include a media content-receiving unit 510, a processor 520, a storage unit 530, and a network interface unit 540. The processor 520 may be configured to include a key information-detecting unit 521 and an identification information-generating unit 522 as hardware. The server 320 may include more or less elements than as illustrated in FIG. 5. For example, the storage unit 530 may be included outside the server 320 to be configured as a database server.

The media content-receiving unit 510 is configured to receive the same media content as the media content-receiving unit 120 of FIG. 1. Accordingly, receivable media content may include real-time broadcasting content including live broadcasting.

The key information-detecting unit 521 included in the processor 520 detects closed caption information from the media content received from the media content-receiving unit 510. Closed caption information refers to subtitle information and may include special additional information. Additional information may include key information with which media content-related information can be searched for according to an embodiment of the present invention.

The key information-detecting unit 521 may include a decoder filter as hardware to detect closed caption information. The key information-detecting unit 521 may detect from the detected caption information, nouns corresponding to key words and/or noun phrases, verbal phrases, adjective phrases, pre-noun phrases, and adverbial phrases corresponding to key phrases. Keywords or key phrases may be detected by being compared with nouns or phrases defined in a dictionary. To this end, the key information-detecting unit 521 may include a dictionary function.

When key information is detected, the identification information-generating unit 522 generates identification information of media content (or a video frame) based on which key information is detected. The generation of identification information may involve generating a digital fingerprint of a video frame as described in regard to the identification information-generating unit 161 of FIG. 1.

The processor 520 synchronizes the key information detected by using the key information-detecting unit 521 and the identification information generated by using the identification information-generating unit 522 and stores the synchronized information in the storage unit 530. Also, the processor 520 may search for media content-related information via the network interface unit 540 based on the detected key information, and synchronize a result of the search with the key information and store the synchronized information in the storage unit 530. Media content-related information may be searched for from among the media content-related information generating system 330 of FIG. 3, but is not limited thereto.

The storage unit 530 may synchronize key information and identification information and store the same, or may synchronize key information, identification information, and media content-related information and store the same. Also, processor 520 may store programs and data that are used to perform the method for providing media content-related information according to the current embodiment of the present invention.

Figure 6:
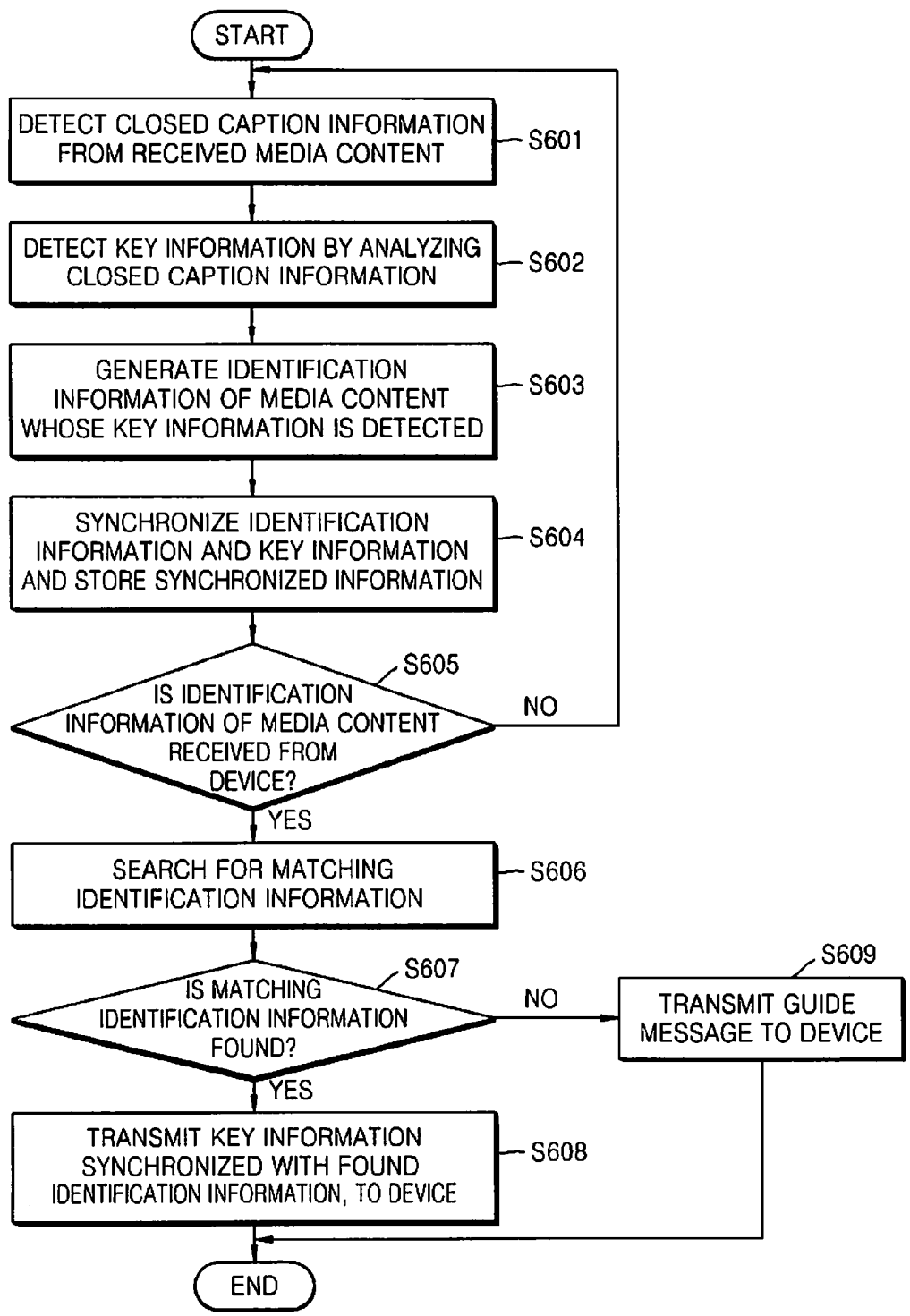
FIG. 6 is a flowchart illustrating a method for providing media content-related information via a server according to an embodiment of the present invention.

The processor 520 controls all functions of the server 320, and may be defined as a controller or a microprocessor, but is not limited thereto. The processor 520 may operate as illustrated in FIG. 6. FIG. 6 is a flowchart illustrating a method for providing media content-related information via the server 320, according to an embodiment of the present invention. As illustrated in the network system 300 illustrated in FIG. 3, the server 320 may be accessed by the device 100 via the network 310 to provide media content-related information to the user. Accordingly, FIG. 3 is an illustrative diagram of a network system in which the device 100 and the server 320 may be applied, according to an embodiment of the present invention.

Referring to FIG. 6, the processor 520 detects closed caption information from media content that is received via the media content-receiving unit 510 in step S601. The processor 520 analyzes the closed caption information to detect key information in step S602. Key information may be detected in a manner as described in regard to the key information-detecting unit 521. In step S603, the processor 520 detects identification information of media content based on which key information is detected.

The processor 520 synchronizes the detected identification information and the detected key information and stores the synchronized information in the storage unit 530 in step S604. When identification information of media content is received from at least one device 100 that is connected via a network in step S605, the processor 520 searches for identification information that matches the received identification information from among the identification information stored in the storage unit 530 in step S606. When matching identification information is found, the processor 520 transmits the key information synchronized with the found identification information to the device 100 in steps S607 and S608. When identification information of media content is not received from the device 100 in step S605, the processor 520 returns to step S601 and repeats the above-described process.

Meanwhile, when identification information that matches the identification information received from the storage unit 530 is not found, the processor 520 may transmit a guide message to the device 100 via the network interface unit 540 in steps S607 and S609. The guide message may, for example, be "Media content-related information does not exist."

When the processor 520 included in the server 320 operates as illustrated in FIG. 6, a flowchart of a step between the device 100 and the server 320 may be defined as illustrated in FIG. 7. FIG. 7 is a flowchart illustrating a step between a device and a server, according to an embodiment of the present invention.

Referring to FIG. 7, in step S710, the device 100 and the server 320 receive the same media content. Steps S711 through S717 of FIG. 7 may be regarded as corresponding to steps S601 through S608 of FIG. 6. Steps S718, S715, S719, and S720 of FIG. 7 may be regarded as corresponding to steps S201 through S204 of FIG. 2, respectively.

The processor 520 may operate as illustrated in FIG. 8. FIG. 8 is another flowchart illustrating a method for providing media content-related information via the server 320 according to an embodiment of the present invention.

FIG. 8 corresponds to the flowchart of FIG. 6 to which a function of the server 320 of searching for media content-related information and transmitting the same to the device 100 is added. Thus, steps S801 through S803 correspond to step S601 through S603 of FIG. 6, respectively, and steps S806 through S808 and step S810 correspond to steps S605 through S607 and step S609 of FIG. 6, respectively, and thus descriptions thereof will not be repeated here.

In step S804, the processor 520 of the server 320 searches for media content-related information based on key information via the network interface unit 540. When media content-related information is found, the processor 520 synchronizes identification information, key information, and the found media content-related information and stores the synchronized information in step S805.

When matching identification information is found in step S808, the processor 520 transmits key information and media content-related information that are synchronized with the found identification information, to the device 100 via the network interface unit 540 in step S809.

FIG. 9 is a flowchart illustrating a step between the device 100 and the server 320 illustrated in FIGS. 2 and 8, respectively. The device 100 and the server 320 receive the same media content in step S910 as illustrated in FIG. 7. Steps S911 through S917 of FIG. 9 may be regarded as corresponding to steps S801 through S808 of FIG. 8. In step S918 of FIG. 9, the processor 520 of the server 320 transmits key information and media content-related information synchronized with the found identification information or transmits only synchronized media content-related information. Steps S919, S916, and S920 of FIG. 9 may be regarded as corresponding to steps S201 through S204 of FIG. 2.

The invention can also be embodied as computer readable codes on a computer readable recording medium. The computer readable recording medium is any data storage device that can store data, which can be thereafter read by a computer system. Examples of the computer readable recording medium include Read-Only Memory (ROM), Random-Access Memory (RAM), CD-ROMs, magnetic tapes, floppy disks, optical data storage devices, etc. The computer readable recording medium can also be distributed over network coupled computer systems so that the computer readable code is stored and executed in a distributed fashion.

While this invention has been particularly shown and described with reference to illustrative embodiments thereof, it will be understood by those of ordinary skill in the art that various changes in form and details may be made therein without departing from the spirit and scope of the invention as defined by the appended claims and their equivalents.

What is claimed is:

1. A method for providing media content-related information using a device capable of accessing a server via a network, the method comprising:

reproducing media content by the device generating identification information of the media content being reproduced by the device;

transmitting the identification information from the device to the server;

receiving, at the device, key information or both the key information and media content-related information, from the server, based on the identification information, wherein the key information is based on closed caption information synchronized with the media content and the media content-related information is determined using the key information; and when the key information is received from the server, determining, at the device, the media content-related information from the key information, and outputting, using the device, the media-content information determined at the device;

when both the key information and the media content-related information are received from the server, outputting, using the device, the media content-related information received from the server.

2. The method of claim 1, wherein generating the identification information of the media content is performed based on a change of media content included in one of frames depicting the same scene and frames that are divided by a single camera operation.

3. The method of claim 2, wherein generating the identification information of the media content comprises:

generating the identification information when media content included in the frames does not change for a predetermined period of time.

4. The method of claim 1, wherein the identification information of the media content comprises:

a digital fingerprint of a frame of the media content being reproduced by the device.

5. The method of claim 1, wherein outputting the media content-related information, comprises:

when the key information is received from the server, searching for the media content-related information based on the key information received via the network; and outputting the found media content-related information.

6. The method of claim 1, wherein outputting the media content-related information comprises:

outputting the received media content-related information when the media content-related information is received from the server.

7. The method of claim 1, wherein outputting the media content-related information comprises:

selecting outputting the key information according to a user input when the key information and the media content-related information are received from the server.

8. The method of claim 1, wherein the media content comprises one of a broadcasting program, broadcasting content, video content, audio content, and combined video and audio content.

9. A non-transitory computer-readable storage medium having embodied thereon a computer program for executing a method for providing media content-related information by using a device capable of accessing a server via a network, the method comprising:
- reproducing media content by the device;
- generating identification information of the media content being reproduced by the device;
- transmitting the identification information from the device to the server;
- receiving, at the device, key information or both the key information and media content-related information, from the server, based on the identification information, wherein the key information is based on closed caption information synchronized with the media content and the media content-related information is determined using the key information; and
- when the key information is received from the server, determining, at the device, the media content-related information from the key information, and outputting, using the device, the media-content information determined at the device;
- when both the key information and the media content-related information are received from the server, outputting, using the device, the media content-related information received from the server.

10. A device, comprising:
- a media content-receiving unit for receiving media content;
- a reproducing unit for reproducing the received media content;
- a network interface unit for interfacing with a network; and
- a processor controls the media content-receiving unit, the reproducing unit, and the network interface to:
  - reproduce the media content by the reproducing unit,
  - generate identification information of the media content that are currently being reproduced by using the reproducing unit,
  - transmit the generated identification information to a server via the network interface unit,
  - receive key information or both the key information and media content-related information, from the server,
  - when the key information is received from the server, determine the media content-related information from the key information, and output the media-content information determined at the device by using the reproducing unit;
  - when both the key information and the media content-related information are received from the server, output the media content-related information received from the server by using the reproducing unit;
  - wherein the key information is based on closed caption information synchronized with the media content and the media content-related information is determined using the key information.

11. The device of claim 10, wherein the processor generates identification information of media content that is currently being reproduced, based on a change of media content included in one of frames depicting the same scene and frames that are divided by a single camera operation.

12. The device of claim 10, wherein the identification information of the media content comprises:
- a digital fingerprint of a frame that is currently being reproduced by the device.

13. The device of claim 10, wherein when the key information is received from the server, the processor controls the network interface to search for the media content-related information based on the received key information via the network interface unit, and controls the reproducing unit to output the found media content information.

* * * * *